Feb. 21, 1933. L. H. LARSEN 1,898,192
GOODS HOLDING AND DISPENSING UNIT
Filed April 2, 1928 2 Sheets-Sheet 1
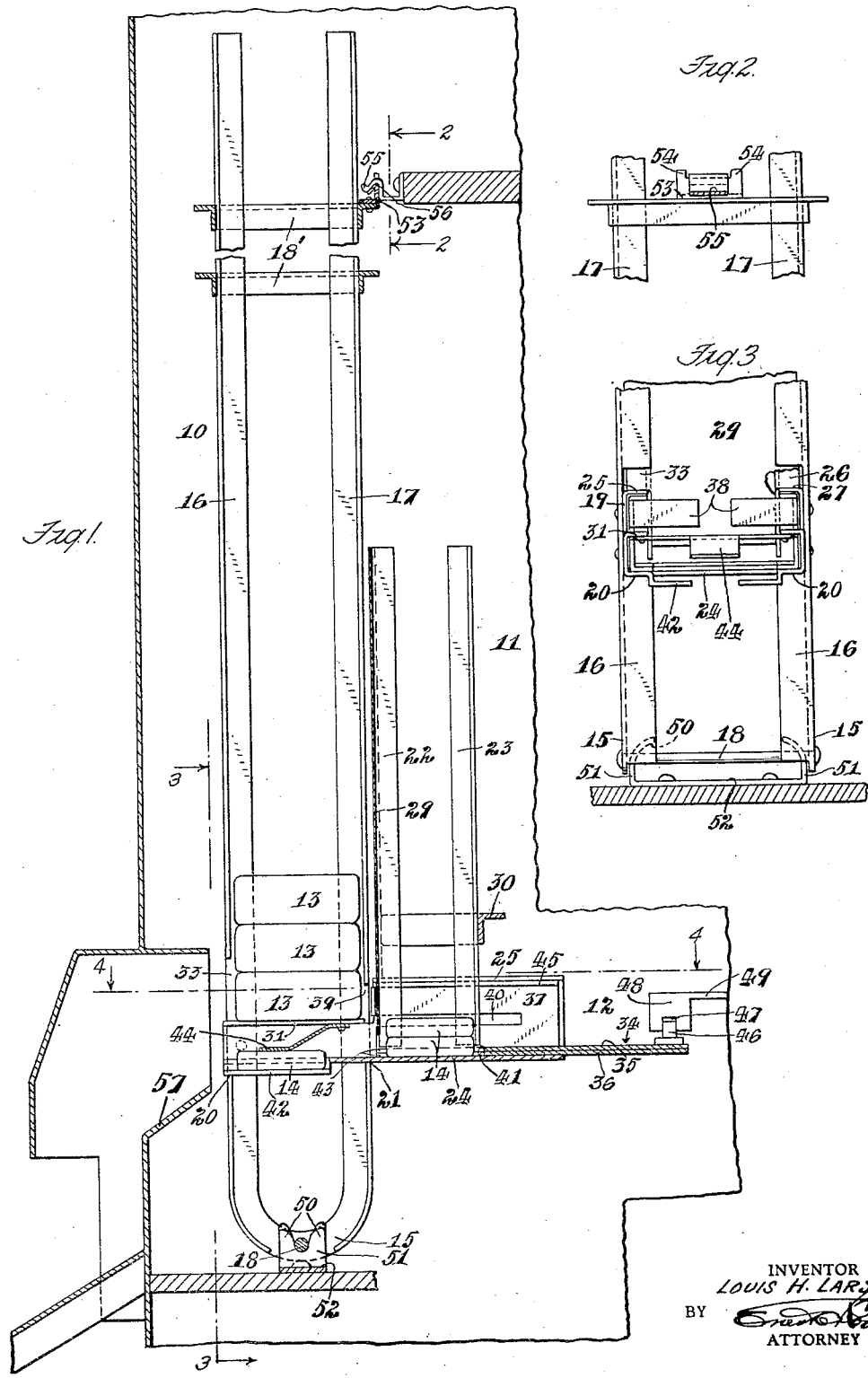
INVENTOR
LOUIS H. LARSEN
BY 
ATTORNEY Feb. 21, 1933.                L. H. LARSEN                1,898,192
                    GOODS HOLDING AND DISPENSING UNIT
                       Filed April 2, 1928        2 Sheets-Sheet 2
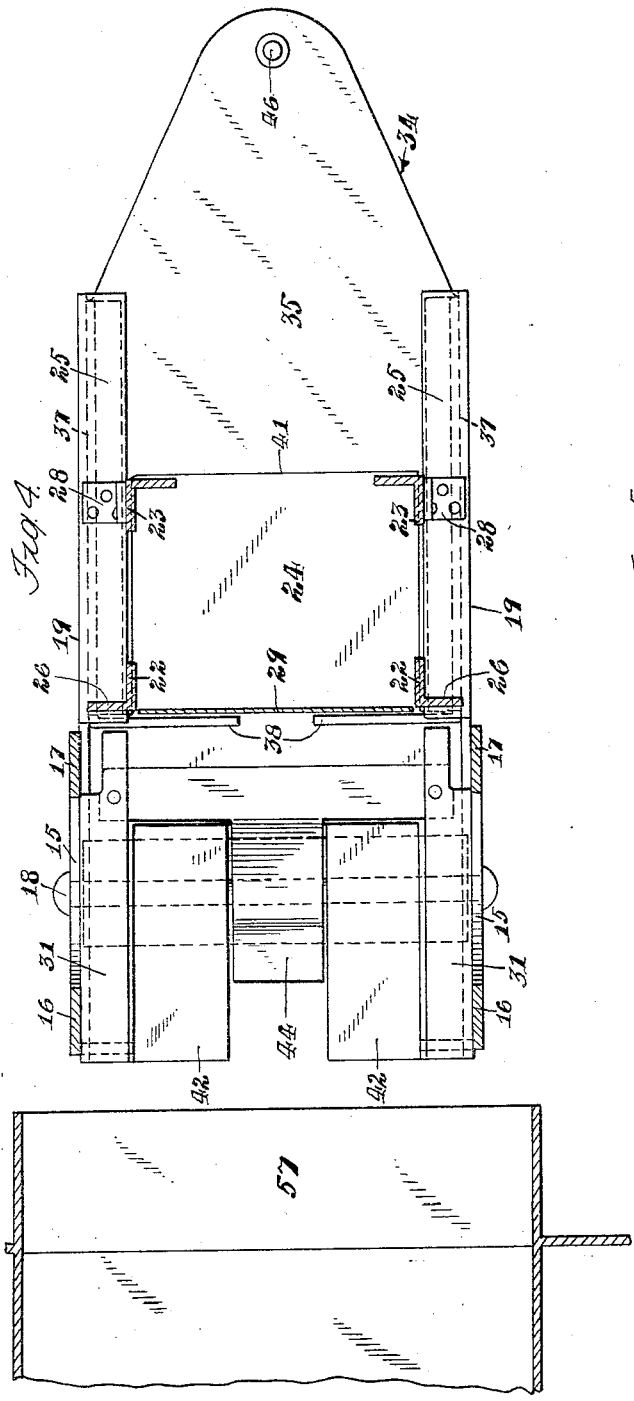
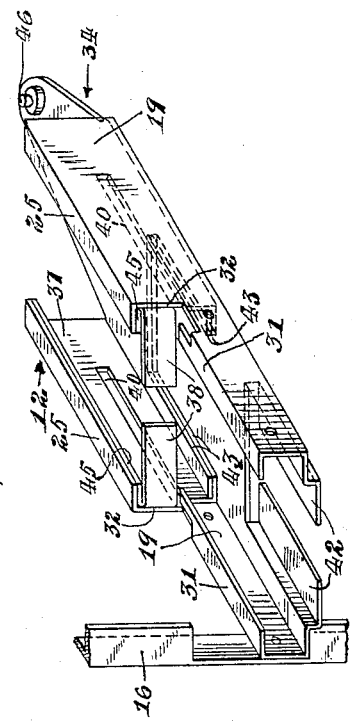
INVENTOR
LOUIS H. LARSEN
BY
ATTORNEY Patented Feb. 21, 1933

1,898,192

UNITED STATES PATENT OFFICE

LOUIS H. LARSEN, OF UNION CITY, NEW JERSEY, ASSIGNOR TO NIXON VENDING AND CHANGE MAKING MACHINES, INC., OF NEW YORK, N. Y., A CORPORATION OF DELAWARE

GOODS HOLDING AND DISPENSING UNIT

Application filed April 2, 1928. Serial No. 266,680.

This invention relates to a goods holding and dispensing unit, and the same has for its main object the provision of an improved construction of this character for use in connection with vending machines, combined vending and change making machines, and similar apparatus, whether appertaining to the classes thereof known as coin-controlled machines or otherwise.

An object of the invention is the provision of a goods holding and dispensing device in the form of a compact self-contained operative unit which will embody certain desired features of simplicity, efficiency and convenience, and which will be economical in manufacture.

Another object of the invention is the provision of a goods holding and dispensing unit having a duplex character, capable of containing two columns or kinds of commodities, and provided with a novel delivery mechanism constructed and arranged so that upon each pushing action thereof, it can effectuate the discharge of one article from each of the two columns or kinds of commodities.

Another object of the invention is the provision of a unit of this character embodying as an important feature thereof a novel bridge frame in which the delivery mechanism is arranged for operation and which is constructed and arranged so as to provide two outlet passageways for the discharge of the commodities, there being one such passageway for each of the two columns or brands of commodities.

A still further object of the invention is the provision, for purposes of assembly, restocking, interchangeability and the like, of a unit which may be characterized as quick detachable, the same being so designed and comprehending such features of improvement as to enable it to be readily and quickly connected to suitable supporting and operating means and to be as readily and quickly disconnected therefrom.

Other objects will appear hereinafter.

The invention consists in the details of construction and in the arrangement and combination of parts hereinafter described and claimed.

The invention will be best understood by reference to the accompanying drawings forming a part of this specification, and in which:

Fig. 1 represents a vertical fragmentary section of a machine embodying my improved goods holding and dispensing unit, which is shown in vertical section;

Fig. 2 represents a rear elevational view of the top attaching means, this view being taken on the line 2—2 of Fig. 1;

Fig. 3 represents a front elevational view taken on the line 3—3 of Fig. 1, illustrating in particular the arrangement of the bridge structure, the delivery mechanism carried thereby, and the means for securing the lower end of the unit;

Fig. 4 represents a plan and section through the unit from the front to the rear thereof and including in advance of the front portion a fragment of the goods receiving chute associated therewith, this view being taken on the line 4—4 of Fig. 1; and Fig. 5 represents a perspective view of the channel-shaped bridge structure and delivery mechanism carried thereby.

The preferred form of construction as illustrated in the accompanying drawings comprises two upright holders referred to in general by the reference numerals 10 and 11 representing, respectively, front and rear holders, the same being arranged to constitute means for maintaining in place columns of stacked packages containing any goods, articles or merchandise to be sold or delivered, such as confectionery, cigarettes, matches, or other articles of commerce. As shown in the drawings these holders are preferably of skeleton form, comprising connected uprights produced mainly from lengths of angle-iron, arranged to feed the packages downwardly from the open inlet top ends of the holders, so that they will be supported in stacked formation upon supporting surfaces carried by the connected channel-shaped bridge structure, indicated in general by the reference numeral 12.

In the present exemplification, the front holder 10, which is employed as the means for supporting the unit and which is of greater size both as to height and as to cross dimension than the rear holder 11 in order to be capable of maintaining packages 13 of greater area and thickness than the packages 14 within the rear holder 11, is produced from two lengths of angle-iron, each length comprising a side of the holder and being bent intermediate its length to provide a lower curved end 15 connecting front and rear corner uprights 16 and 17. The two curved ends 15 are connected by a pin 18 while the front and rear corner uprights 16 16 and 17 17 are all connected or embraced at intervals by any suitable outside cross pieces as, for instance, by angle-irons 18'.

At an appropriate distance above the cross pin 18, the channel-shaped bridge structure 12 has it forward portion secured to the uprights of the holder 10 so that said structure will be supported entirely by said holder and will project rearwardly therefrom. In carrying out this assembly in the present instance, the vertical opposite sides 19 of the channel-shaped bridge structure 12 are secured flat against the inner flat faces of the front and rear uprights 16 and 17, the interfering transverse flanges of said uprights being suitably cut away, for instance at 20 for the uprights 16 and at 21 for the uprights 17, to accommodate the application and seating of said structure. The means for making the sides 19 rigid with the uprights may consist in spot-welding them thereto, riveting them thereto, or otherwise.

The rear and smaller holder 11 consists of the front and rear pairs of angle-iron lengths 22 22 and 23 23, respectively. They extend down into the bridge structure 12 so that the column of packages 14 maintained thereby will be supported upon the bottom 24 of said structure. As shown herein, they have flat contact with the opposite ledges 25 inturned from the vertical sides 19 of the bridge structure, the front angle-iron uprights 22 being set with their angle spaces outwardly and having their outwardly projecting flange portions 26 ending at the ledges 25 so as to rest thereon as at 27. The rear uprights 23 may be conveniently supported upon the ledges 25 by suitable brackets 28; and except at the front of this holder where a plate 29 is connected between the uprights 22 in order to maintain the packages in place, any suitable outside cross pieces as 30 may be employed as necessary to give the holder the desired rigidity.

The column of packages 13 within the holder 10 is supported upon ledges 31 inturned from the vertical sides 19 of the bridge structure; and it will be observed in this connection that said vertical sides 19 are offset downwardly at 32 so that the ledges 31 lie in a plane lower than that of the ledges 25. In front of the ledges 31 the transverse flanges of the uprights 16 are cut away to provide openings 33 of sufficient size to permit the ejection therethrough of a package 13. In this manner provision is made for supporting the column of packages within the front holder 10 upon the ledges 31 with the lowermost package 13 in position to be ejected through the outlet passageway comprising the openings 33; and provision is also made for supporting the column of packages within the rear holder 11 upon the bottom 24 with the lowermost package 14 in position to be ejected through the outlet passageway comprising the interior of the channel-shaped bridge structure and leading forwardly underneath the ledges 31 to the open front end of said structure.

Arranged within the channel-shaped bridge structure 12 is a delivery slide denoted in general by the numeral 34 and comprising, as herein shown, body plates 35 and 36, rigidly connected. The body plate 36 has sliding contact with the bottom 24 and is provided with opposite side members 37 sliding on the inner faces of the vertical sides 19 between the bottom 24 and ledges 25. Said side members 37, extending forwardly on either side of the holder 11, carry between the holders 10 and 11 transversely extending pushing bars 38 at an elevation where they will pass over the ledges 31 and eject the lowermost package 13, there being suitable openings 39 in the transversely extending flanges of the uprights 17 to accommodate said pushing bars and said members 37 being suitably slotted at 40 to pass astride the ledges 31.

For ejecting the lowermost packages 14 from the holder 11, the rigidly connected body plates 35 and 36 have co-extensive pushing edges 41; and for conducting the ejected package into a seat or hollow resulting from the provision of ledges 42 downwardly offset from the bottom 24 at the front end thereof, the said body plates 35 and 36 are made with co-extensive arms 43 flanking both sides of the package 14. From an inspection of Fig. 1, it will be observed that the ledges 42 are downwardly offset from the bottom 24 a distance less than the thickness of the package 14, so that such package, when resting on said ledges, will project above the top surface of the bottom 24, where it will be engaged and therefore ejected from the ledges 42, by the next package being propelled from the holder 11 to its seat on said ledges. A spring 44, attached at one end to the underfaces of the ledges 31, is arranged to guide the package 14 downwardly into its seat upon the ledges 42 and to maintain the package in place thereon against escape until it is ejected by the next package propelled into the seat.

In operation, assuming that a corresponding number of packages have been placed in the two holders 10 and 11 and that a leader package has been placed on the ledges 42, the delivery slide will, on each forward or pushing stroke thereof, cause the ejection of a package 13 and a package 14, until the holders have been exhausted of their contents. Obviously, when the holder 11 has been exhausted of its contents, the last package ejected therefrom will be held upon the ledge 42. As the pushing bars 38 eject a package 13 from the ledges 31 the next succeeding package in the column, if the pushing action be a slow one, will first drop upon the inturned ledges 45, which are provided for such special purpose along the top edges of the side members 37. Then on the retiring action of the delivery slide, such next succeeding package will drop onto the ledges 31. As the pushing edges 41 eject a package 14 from the holder 11, the next succeeding package in the column will settle down upon the top body plate 35, when the pushing action is a slow one; and then upon the retiring movement of the delivery slide, such package will fall upon the bottom plate 24. In practice it is desirable to place a weight (not shown) upon the topmost package of each column, the object of this expedient (which is a common one for the purpose) being to force a prompt settling of the packages after each ejection and to hold firmly the package to be ejected, especially when it is the last or nearly the last package in the holder.

Movement, both pushing and retiring, may be imparted to the delivery slide by any suitable mechanism. In the present instance, the delivery slide is equipped at its rear end with a pin 46 adapted to be received in a transverse slot 47 provided in the head 48 of the actuator arm 49. By this arrangement, the delivery slide may be quickly connected to, and as quickly disconnected from, the actuating means. Moreover, where the unit is mounted upon a rotary magazine to turn therewith, this arrangement enables the pin to slide into and out of operative engagement with its actuating means as the magazine turns.

The unit may be mounted for its support by placing the pin 18 between the inwardly curved forks 50 provided on the ends 51 of the bracket 52. This is an important feature. It not only provides for quick mounting and demounting, but also provides an efficient mounting, since the curved portions 15 of the front holder act as stops to limit endwise play while the forks prevent lateral play. At the top of the front holder 10 I preferably provide a snap connection comprising a bracket 53 having upstanding end lugs 54 between which a curved spring 55 may be readily engaged, the spring snapping over the curved body portion 56 between the lugs 54. The bracket 53 may be conveniently supported on an angular cross piece 18'. A goods receiving chute as 57 may be conveniently provided to receive the packages 13 and 14 as they are ejected from the unit.

It will be understood that this quick detachable duplex unit may be employed in connection with any vending machine, or other apparatus that delivers by the operation of a pushing stroke or its equivalent.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim is:

1. A package holding and dispensing device comprising, in combination, upright holders for containing adjacent stacks of packages, a channel-shaped structure fixed to the lower ends of the holders and having substantially horizontal outlet compartments individual to the holders for receiving therefrom the lowermost packages of the stacks, a movable member within the channel-shaped structure, and pushers individual to the compartments moved by said member, said pushers being effective to remove from the stacks the lowermost packages which are received in the compartments.

2. In a package holding and dispensing device, the combination of a plurality of adjacent upright holders, each adapted to contain a stack of packages, a channel-shaped structure fixed to the lower ends of the holders and divided into outlet compartments individual to the holders for receiving therefrom the lowermost packages of the stacks, said compartments being substantially horizontal and including a relatively short compartment and a relatively long compartment, with the latter extending beneath the former, and an operative member within the channel-shaped structure provided with pushers individual to the compartments and effective therein for removing the lowermost packages of the stacks and causing the ejection of the same from the compartments.

3. In a goods holding and dispensing unit, a front goods holder; a rear goods holder; a channel-shaped bridge structure fixed to the lower portions of said holders for supporting stacks of goods therein and constructed to provide for each holder an outlet passageway, the passageway for the rear holder extending beneath the passageway for the front holder and terminating in a downwardly offset portion; and a delivery slide in said structure with a part arranged in the passageway for the front holder to eject therefrom the lowermost article of goods and a part arranged in the passageway for the rear holder to eject therefrom the lowermost article of goods and conduct it into said offset portion.

4. In a goods holding and dispensing unit, a front goods holder; a rear goods holder; a bridge structure fixed to said holders for supporting stacks of goods therein and constructed to provide for each holder an outlet passageway, the passageway for the rear holder extending beneath the passageway for the front holder and terminating in a downwardly offset portion; a delivery slide in said structure with a part arranged in the passageway for the front holder to eject an article of goods therefrom and a part arranged in the passageway of the rear holder to eject an article of goods therefrom and conduct it into said offset portion; and means for releasably maintaining the article in place in said offset portion, whence to be expelled by the next article of goods conducted into said offset portion.

5. A goods holding and dispensing unit comprising, in combination, a goods holder; a channel-shaped bridge structure fixed thereto and projecting therefrom; ledge means on said structure for supporting a stack of goods in said holder; a second goods holder rising from said structure; means on said structure for supporting a stack of goods in said second holder; located in a plane below the plane of said ledge means; and a delivery slide in said structure having parts arranged to eject the lowermost articles of goods from said first named holder and said second holder, respectively.

6. A goods holding and dispensing unit comprising, in combination, upright front and rear goods holders; a bridge structure connecting said holders and receiving therein the lower end of the rear holder; means on said structure for supporting a stack of goods within each of said holders; a delivery slide in said structure arranged to eject goods from said holders; and side members on said slide flanking said rear holder and carrying pusher means arranged to eject goods from said front holder.

7. A goods holding and dispensing unit comprising, in combination, upright front and rear goods holders; a bridge structure connecting said holders and receiving therein the lower end of the rear holder; a bottom in said structure constituting means for supporting a stack of goods within said rear holder and terminating in a downwardly offset portion; ledge means on said structure in a plane above said bottom for supporting a stack of goods within said front holder; a delivery slide in said structure arranged to eject goods from the rear holder and including guides for conducting said ejected goods into said offset portion; and side members on said slide carrying pushing means in advance of said rear holder for ejecting goods from said front holder.

8. A goods holding and dispensing unit comprising, in combination, upright front and rear goods holders; a bridge structure connecting said holders; a bottom in said structure for supporting a stack of goods within said rear holder and terminating in a downwardly offset portion; ledge means on said structure in a plane above said bottom for supporting a stack of goods within said front holder; a delivery slide in said structure arranged to eject goods from the rear holder and including guides for conducting the ejected goods into said offset portion, whence to be ejected by the next goods conducted from said rear holder; a spring depending from said ledge means for releasably holding the goods in place in said offset portion; and side members on said slide carrying pushing means in advance of said rear holder for ejecting goods from said front holder.

9. In a goods holding and dispensing unit, the combination of a channel-shaped structure whose opposite sides have means associated therewith for maintaining thereon a front column of articles and whose bottom has means associated therewith for maintaining thereon a rear column of articles; and a delivery slide mounted in said structure and having a pushing edge at the rear of said rear column to eject therefrom the lowermost article resting on said bottom and having also side members carrying pushing means at the rear of said front column adapted to eject therefrom the lowermost article resting on said opposite sides.

10. In a goods holding and dispensing unit, the combination of a channel-shaped bridge structure having surfaces rigid therewith for supporting front and rear columns of articles in adjacency, the supporting surface for the front column being in a plane higher than the plane in which the supporting surface for the rear column lies; and a delivery slide slidably fitting within said structure and forming a cooperative component part thereof, provided with a part arranged to pass over the lower surface for ejecting an article from the rear column and a separate part adapted to pass over the higher surface for ejecting an article from the front column.

11. In a goods holding and dispensing unit, a channel-shaped bridge structure having opposite sides inturned to produce ledges at lower and higher elevations; and a delivery slide slidably arranged in said structure with side members slidably fitting between the bottom of said structure and said higher ledges, said side members being slotted to pass astride said lower ledges.

12. In a goods holding and dispensing unit, a channel-shaped bridge structure having its opposite sides inturned to produce ledges at lower and higher elevations; a downwardly offset portion in the bottom of said structure below said lower ledges; a delivery slide slidably mounted in said structure and provided with side members slidably fitting between the bottom of said structure and said higher ledges, said side members being slotted to pass astride said lower ledges; and arms projecting from said slide adapted to conduct an article into said offset portion.

13. In a goods holding and dispensing unit, a channel-shaped structure having its opposite sides inturned to produce ledges at lower and higher elevations; a downwardly offset portion in the bottom of said structure below said lower ledges; a delivery slide slidably mounted in said structure and provided with side members slidably fitting between the bottom of said structure and said higher ledges, said side members being slotted to pass astride said lower ledges; arms projecting from said slide adapted to conduct an article into said offset portion; and a spring depending from said lower ledges adapted releasably to maintain an article in said offset portion.

14. A goods holding and dispensing device for the purpose set forth comprising two upright frame structures, each adapted to retain stacked goods, a transverse bridge connecting said structures and supported thereby, said bridge being channel-shaped and provided with parts forming bottom supporting means for the stacked goods within each of said structures, with outlet passageways for the goods at one end of the bridge, the bottom supporting means in one structure being at a lower level than the bottom supporting means in the other structure and the outlet passageway from the lower bottom supporting means extending beneath the higher bottom supporting means, and a delivery slide arranged within the channel of the bridge and having members adapted to push goods from each of said bottom supporting means and through each of said outlet passageways.

In testimony whereof, I have signed my name to this specification.

LOUIS H. LARSEN.